US007233743B2

(12) United States Patent
Ozugur et al.

(10) Patent No.: US 7,233,743 B2
(45) Date of Patent: Jun. 19, 2007

(54) LIGHTPATH SEGMENTATION SYSTEM AND METHOD IN A GENERALIZED MULTI-PROTOCOL LABEL SWITCHING NETWORK

(75) Inventors: Timucin Ozugur, Garland, TX (US); Dominique Verchere, Plano, TX (US); Jason Jue, Plano, TX (US)

(73) Assignee: Alcatel Lucent, Paris (FR)

( * ) Notice: Subject to any disclaimer, the term of this patent is extended or adjusted under 35 U.S.C. 154(b) by 783 days.

(21) Appl. No.: 10/184,180

(22) Filed: Jun. 27, 2002

(65) Prior Publication Data

US 2004/0001714 A1 Jan. 1, 2004

(51) Int. Cl.
*H04J 14/02* (2006.01)
*H04B 10/00* (2006.01)
(52) U.S. Cl. .......................................... 398/79; 398/45
(58) Field of Classification Search ............ 398/43–97; 370/229–258, 351–427
See application file for complete search history.

(56) References Cited

U.S. PATENT DOCUMENTS

| 2002/0018264 A1* | 2/2002 | Kodialam et al. | 359/128 |
| 2002/0186689 A1* | 12/2002 | Miyabe | 370/355 |
| 2003/0147645 A1* | 8/2003 | Imajuku et al. | 398/7 |

OTHER PUBLICATIONS

Mannie, et al.; Generalized Multi-Protocol Label Switching (GMPLS) Architecture; IETF Network Working Group; internet draft; Mar. 2002.
Jue, et al.; Analysis of Blocking Probability for Connection Management Schemes in Optical Networks; GLOBECOM '01; IEEE Global Telecommunications Conference; vol. 3; pp. 1546-1550.
Widjaja I et al, "Study of GMPLS Lightpath Setup Over Lambda-Router Networks", ICC 2002. 2002 IEEE International Conference on Communications. Conference Proceedings. New York NY, Apr. 28-May 2, 2002, IEEE International Conference on Communications, NY, NY, IEEE, US, vol. 1 of 5, Apr. 28, 2002, pp. 2707-2711, XP010589973.
Berger L: "Generalized Multi-Protocol Label Switching (GMPLS) Signalling Functional Description" IETF Networking Group RFC3471 Standards Track, Jan. 2003 (2003-01), XP002287847.

\* cited by examiner

*Primary Examiner*—Jason Chan
*Assistant Examiner*—David Lee

(57) ABSTRACT

A lightpath segmentation system and method for use in a GMPLS network is described. In one embodiment, lightpaths are divided into segments according to the distribution of the wavelength-converter-equipped optical switches, or nodes, within a WDM network. As the number of hops within the segment increases, a lightpath segmentation probability increases. When a wavelength-converter-equipped node receives an LSP Request message, it calculates the LPSP and, if the LPSP exceeds a threshold, the node sets up a lightpath between itself and the ingress node or a previous upstream wavelength-converter-equipped node, if the lightpath has already been segmented.

22 Claims, 5 Drawing Sheets

LIGHTPATH SEGMENTATION SYSTEM AND METHOD IN A GENERALIZED MULTI-PROTOCOL LABEL SWITCHING NETWORK

BACKGROUND OF THE INVENTION

1. Technical Field of the Invention

The present invention generally relates to optical networks. More particularly, and not by way of any limitation, the present invention is directed to a lightpath segmentation system and method for application in a Generalized Multi-Protocol Label Switching ("GMPLS") network for facilitating fair and effective reservation of lightpaths therein.

2. Description of Related Art

In all-optical GMPLS wavelength division multiplex ("WDM") networks, lightpaths, or label switch paths ("LSPs"), may collide and fail during the lightpath establishment procedure. This is referred to as the wavelength collision problem. Shorter lightpaths have an advantage over longer lightpaths in reserving wavelengths. FIG. 1, which depicts a block diagram of an optical network 100, illustrates why this is the case.

In particular, assuming for the sake of example that a first LSP Request ("LSP Request 1") requesting establishment of a first lightpath 102 between an ingress node 103a and a egress node 103b, and a second LSP Request ("LSP Request 2") requesting establishment of a second lightpath 104 between a ingress node 105a and a egress node 105b, are from their respective ingress nodes along their respective paths at the same time. Because the lightpath 104 is shorter, LSP Request 2 will be received at the egress node 105b before LSP Request 1 is received at the egress node 103b. Consequently, the lightpath 104 will be established first.

This may also be the case in a situation where the LSP Request 1 is issued before the LSP Request 2, given that lightpath 102 is significantly shorter than lightpath 104. If both lightpaths 102, 104, reserve the same wavelength, a collision, referred to as a "reverse collision", will occur at the node 105b and appropriate error messages will be sent to nodes 103a and 103b, indicating that a different wavelength must be reserved for the lightpath 102.

In existing protocols for lightpath reservation in GMPLS, an optical switch controller ("OSC") at each node in an optical network maintains two "pools" of wavelengths, including an "Available Pool" ("AP") and a "Used Pool" ("UP"). The AP includes wavelengths that available to be reserved by a lightpath. The UP comprises wavelengths that are currently being used by existing lightpaths.

Currently, in the GMPLS signaling control plane (RSVP/LDP/CR-LDP), upstream nodes insert a "Label Set" object into each LSP Request (e.g., Path) message. The Label Set object suggests the labels (which correspond directly to wavelengths in the optical domain) that can be selected by the downstream nodes. In other words, the Label Set represents the wavelengths available for selection as indicated in the AP. Downstream nodes select one of the labels, or wavelengths, in the Label Set as specified in the Label Set object.

In general, at each node along the path during LSP establishment, the OSC at the node compares the wavelengths of the Label Set object with those in its UP and removes from the Label Set object any common wavelengths. Similarly, once a wavelength has been reserved by a lightpath, the reserved wavelength is removed from the AP and included in the UP maintained by each node along the path.

FIG. 2 illustrates lightpath establishment procedures in a GMPLS network 200. The GMPLS approach, with RSVP control plane, establishes a lightpath 201 between an ingress node 202 and an egress node 204 via intermediate nodes 205a–205d using Path messages, such as a Path message 206, and Resv messages, such as a Resv message 208. The Path message 206 includes a Label Set object that defines a Label Set comprising a list of the wavelengths available for selection at each node 205a–205d along the lightpath 200. As described above, and as illustrated in FIG. 2, at each node along the lightpath 201, the Label Set contained in the Path message 206 is examined and wavelengths that are in use at that node are removed therefrom.

Accordingly, a first Label Set 210a between the ingress node 202 and a first intermediate node 205a larger than subsequent Label Sets 210b, 210c, 210d, and 210e, between subsequent node pairs 205a/205b, 205b/205c, 205c/205d, and 205d/204, respectively, such that the Label Set 210e that reaches the destination, or egress node 204, may be relatively small compared to the initial Label Set 210a. Clearly, some of the wavelengths contained in the Label Set 210e may be in the Used Pool of the egress node 204, leaving even fewer available wavelengths from which a wavelength may be reserved for the lightpath 201. A situation in which there are no available resources at the destination node is referred to as a "forward collision".

Accordingly, while the above-described prior art techniques address the wavelength continuity problem, they fails to adequately address the short lightpath/long lightpath disparity described above with reference to FIG. 1. Moreover, they fail to solve the reverse collision problem. In particular, present techniques do not prevent the suggestion of the same wavelengths to, and the possible selection of the same wavelength by, more than one LSP. For example, referring again to FIG. 1, assuming LSP Request 1 is issued at a time t1 and LSP Request 2 is issued at a time t2 after time t1. Assuming further that LSP Request 2 is received at the node 105b at a time t3 and LSP Request 1 is received at the node 103b at a time t4 after time t3. If LSP Request 1 is received at the node 105b any time before time t3, the wavelength that will ultimately be assigned to the lightpath 104 will still be in the AP at that node; therefore, it is conceivable that the same wavelength will be assigned to both paths 102 and 104.

Additionally, present techniques provide no solution to the forward collision problem, as illustrated in FIG. 2. Wavelength conversion may reduce or eliminate both forward and reverse collision problems; however, wavelength converters are expensive, rendering it impractical to include such equipment at every node in a network. In order to provide a reasonably-priced optical switches, the number of wavelength converters should be limited and optimized.

SUMMARY OF THE INVENTION

The present invention comprises a lightpath segmentation system and method for use in a GMPLS network that significantly reduces the inherent unfair advantage that shorter lightpaths have over longer lightpaths in reserving a wavelength during lightpath establishment.

In accordance with features of one embodiment, lightpaths are divided into segments according to the distribution of the wavelength-converter-equipped optical switches, or nodes, within a WDM network. Lightpaths for each segment are established separately using a probabilistic approach. In particular, as the number of hops within the segment increases, a lightpath segmentation probability ("LPSP")

increases. When a wavelength-converter-equipped node receives an LSP Request message, such as a Path message, it calculates the LPSP and, if the LPSP exceeds a threshold, the node sets up a lightpath between itself and the ingress node or a previous upstream wavelength-converter-equipped node, if the lightpath has already been segmented.

In one aspect, the invention comprises an optical network using a generalized multi-protocol label switched path protocol for establishing lightpaths in the network, the network comprising an ingress node that transmits a path set-up request message to a destination node, wherein the path set-up request message includes a first label set of available wavelengths for a lightpath from the ingress node to the destination node; and an intermediate node optically connected between the ingress node and the destination node, wherein the intermediate node is equipped with a wavelength converter interface, the intermediate node establishing a first segment of the lightpath between the intermediate node and the ingress node by transmitting a first reserve message to the ingress node and transmitting a second path set-up request message to the destination node with a second label set of available wavelengths for the lightpath; wherein upon receipt of the second path set-up request message, the destination node selects an available wavelength from the second label set of available wavelengths, and reserves a second segment between the destination node and the intermediate node by transmitting a second reserve message to the ingress node.

In another aspect, the invention comprises a method of using a generalized multi-protocol label switched ("GMPLS") path protocol for establishing lightpaths in an optical network, the method comprising the steps of transmitting a path set-up request message from an ingress node to a destination node, the path set-up request message including a first label set of available wavelengths for a lightpath from the ingress node to the destination node; providing an intermediate node optically connected between the ingress node and the destination node with a wavelength converter interface; and transmitting a first reserve message from the intermediate node to the ingress node thereby establishing a first segment of the lightpath. The method further includes the steps of transmitting a second path set-up request message from the intermediate node to the destination node, the second path set-up request message including a second label set of available wavelengths for the lightpath; responsive to receipt at the destination node of the second path set-up request message, selecting an available wavelength from the second label set of available wavelengths; and reserving a second segment between the destination node and the intermediate node by transmitting a second reserve message from the destination node to the ingress node.

In another aspect, the invention comprises a method of using a generalized multi-protocol label switched ("GMPLS") path protocol for establishing lightpaths in an optical network, the method comprising the steps of transmitting a path set-up request message from an ingress node to an egress node via at least one intermediate node, the path set-up request message including a first label set of available wavelengths for a lightpath from the ingress node to the egress node. The method further includes the steps of, at each intermediate node, upon receipt of the path set-up request message determining whether the intermediate node is wavelength-converter-equipped; if the intermediate node is wavelength-converter-equipped, determining whether a lightpath segmentation probability ("LPSP") exceeds a predetermined threshold; if the intermediate node is not wavelength-converter-equipped or if the LPSP does not exceed the predetermined threshold updating the first label set and forwarding the path set-up request message to a next node along the lightpath; and if the intermediate node is wavelength-converter-equipped and the LPSP exceeds a predetermined threshold transmitting a second path set-up request message from the intermediate node to the egress node, the second path set-up request message including a new label set of available wavelengths for the lightpath, and transmitting a first reserve message from the intermediate node to the ingress node. The method further includes the steps of, responsive to receipt at the egress node of a path set-up request message, selecting an available wavelength from the label set of available wavelengths contained within the received path set-up request message and transmitting a second reserve message from the egress node to the ingress node.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
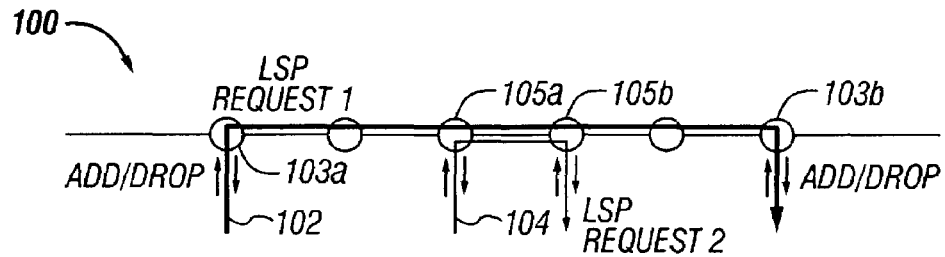
FIG. 1 is a system block diagram illustrating a wavelength collision problem inherent in prior art methods of assigning a wavelength to a flow in an optical network.

In the drawings, like or similar elements are designated with identical reference numerals throughout the several views thereof, and the various elements depicted are not necessarily drawn to scale.

Figure 3A:
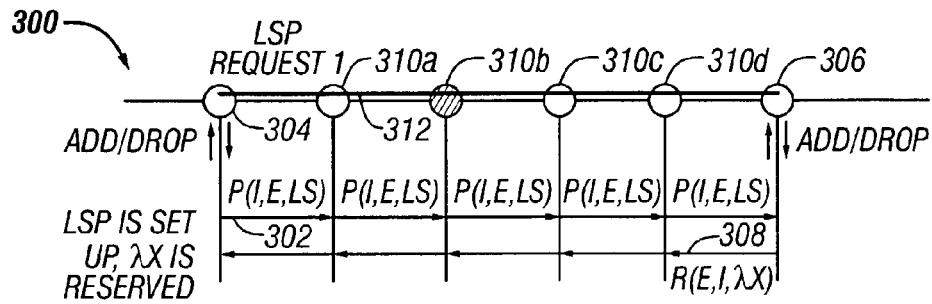
FIG. 3A illustrates successful lightpath establishment using GMPLS.

FIG. 3A illustrates a successful lightpath reservation attempt in a GMPLS network 300. A Path message ("P(I, E, LS)") 302, where "P" indicates that the message is a Path message, "I" identifies the source of the Path message (ingress node 304), "E" identifies the destination of the Path message (egress node 306), and "LS" represents a Label Set, is sent from the ingress node 304 to the egress node 306. When the egress node 306 receives the Path message 302, it selects a wavelength, e.g., wavelength λ1, from the Label Set and sends a Resv message ("R(E, I, λx)") 308, where "R" designates the message as a Resv message, "E" and "I" respectively identify the source and destination of the message(ingress node 306 and egress node 308, respectively), and "λx" represents the selected wavelength (in this case, λ1), back to the ingress node 304. Receipt by the ingress node 304 of the Resv message 308 results in the successful reservation of the selected wavelength (λ1) and an LSP 312 between the ingress node 304 and the egress node 306 via intermediate nodes 310a–310d is set up.

Figure 3B:
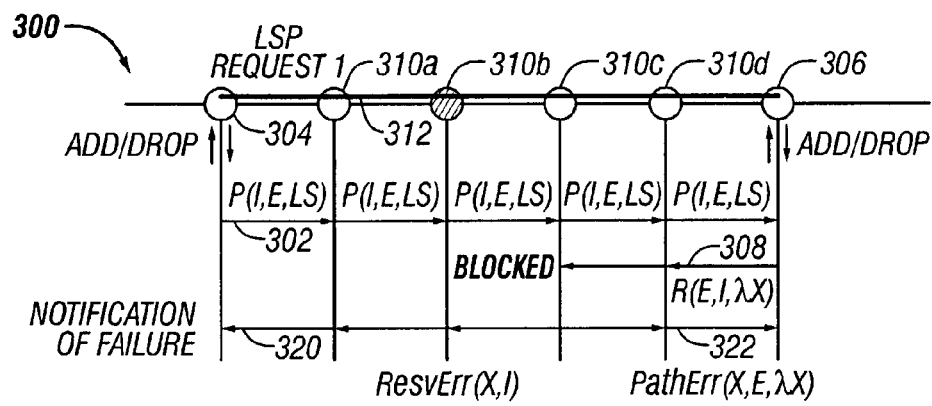
FIG. 3B illustrates unsuccessful lightpath establishment using GMPLS.

FIG. 3B illustrates a prior art technique for handling a situation in which the lightpath reservation attempt illustrated in FIG. 3A is unsuccessful. In particular, it will be assumed that the Path message 302 has been successfully forwarded to the egress node 306, that the egress node has selected a wavelength λ1, and the Resv message 308 has been sent back down the path.

In the case illustrated in FIG. 3B, however, when the Resv message 308 reaches the intermediate node 310c, the reservation is blocked, e.g., due to forward collision. Accordingly, the intermediate node 310c sends a ResvErr message ("ResvErr(X, I)") 320, in which "X" identifies the source of the message (node 310c) and "I" identifies the destination of the message (ingress node 302), is returned to the ingress node notifying the ingress node and intermediate nodes 310a, 310b, of the failure of the reservation. Similarly, a PathErr message ("PathErr(X, E, λx)") 322, in which "X" identifies the source of the message (node 310c), "E" identifies the destination of the message (egress node 306), and "λx" indicates the wavelength that had been reserved (e.g., λ1), is sent to the egress node so that the reserved wavelength can be torn down. At this point, a new attempt to establish a lightpath may be initiated.

Figure 4A:
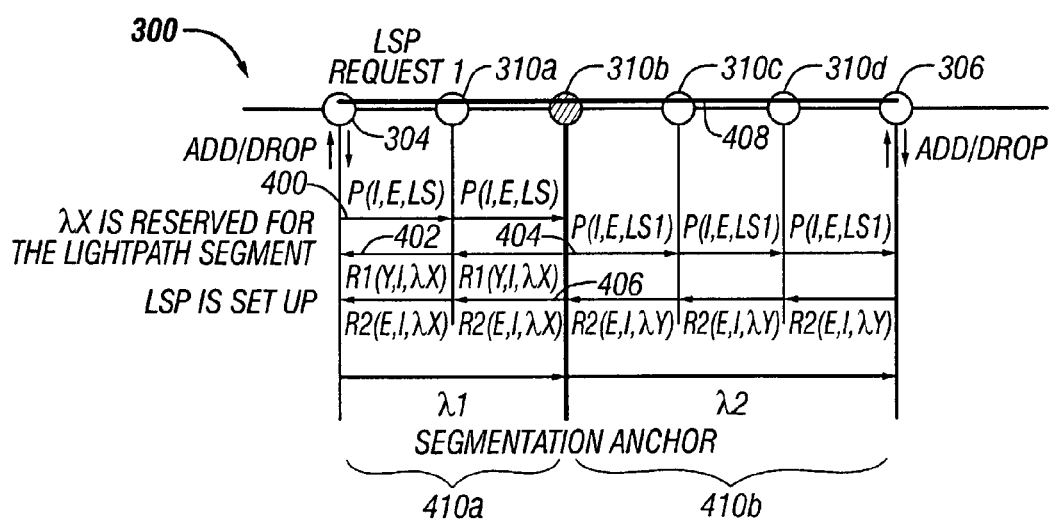
FIG. 4A illustrates successful lightpath establishment using the segmentation methodology of one embodiment of the present invention.

FIG. 4A illustrates the lightpath segmentation methodology of one embodiment as applied to the network 300. It will be assumed for the sake of illustration of the embodiment that the intermediate node 310b is a wavelength-converter-equipped node. In accordance with one embodiment, only wavelength-converter-equipped nodes can perform lightpath segmentation as described herein. As illustrated in FIG. 4A, a first Path message 400 is sent from the ingress node 304 destined for the egress node 306. When the Path message 400 arrives at the node 310b, which, as previously indicated, is equipped with a wavelength converter (not shown), the node calculates the LPSP, as described in greater detail below, and determines that the lightpath should be segmented.

Accordingly, the node 310b selects one of the wavelengths from the Label Set identified in the Path message 400 (e.g., λ1) and issues a first Resv message ("R1 (Y, I, λx)") 402, in which "Y" identifies the wavelength-converter-equipped node (i.e., node 310b) that is the source of the message, "I" identifies the destination of the message (node 304), and "λx" identifies the selected wavelength (i.e., λ1). Additionally, the node 310b enlarges the Label Set to include all of the available wavelengths at the node 310b (that is, all of the wavelengths in an AP of the node 310b) and issues a Path message ("P(I, E, LS1)") 404, in which "LS1" represents the new, enlarged Label Set. In other respects, the Path message 404 is the same as the Path message 400. This concept is described in greater detail below with reference to FIG. 5.

Receipt by the ingress node 304 of the first Resv message 402 indicates to the ingress node that λ1 has been reserved for the first lightpath segment. At this point, the ingress node 304 continues to await receipt of a Resv message from the egress node 306. Accordingly, because there are no other wavelength-converter-equipped nodes along the path to the destination (node 306), once the Path message 400 reaches the egress node 306, the node selects a wavelength from the Label Set, for example, λ2, and generates a second Resv message ("R2 (E, I, λy)") 406, in which "E" identifies the source of the message (node 306), "I" identifies the destination of the message (node 304), and "λy" identifies the selected wavelength (i.e., λ2) for the second segment. Along the path, when the wavelength-converter-equipped node 310b, also referred to as a "Segmentation Anchor," receives the second Resv message 406, it only changes the wavelength designation from λ2 to λ1. Upon receipt by the ingress node 304 of the second Resv message 406, an LSP 408 comprising a first segment 410a, for which λ1 is used, and a second segment 410b, for which λ2 is used, is established between the ingress node 304 and the egress node 306.

Figure 4B:
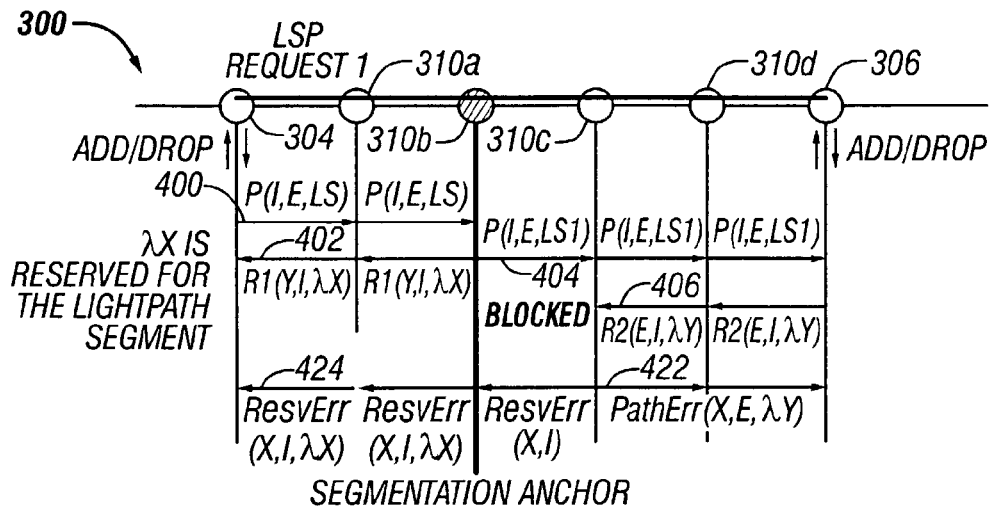
FIG. 4B illustrates unsuccessful lightpath establishment using the segmentation methodology of one embodiment of the present invention.

FIG. 4B illustrates an unsuccessful lightpath segmentation according to one embodiment. The situation illustrated in FIG. 4B is similar to that illustrated in FIG. 4A except that, subsequent to transmission of the second Resv message 406, the lightpath is blocked at the intermediate node 310c. Accordingly, the node 310c issues a PathErr message ("PathErr(X, E, λy)") 422, in which "X" designates the source of the message (node 310c), "E" designates the destination of the message (node 306), and "λy" designates the selected wavelength for the segment, to the egress node 306 to tear down the reserved wavelength λ2. Similarly, the node 310c issues a ResvErr message ("ResvErr(X,I)") 424, in which "X" designates the source of the message (node 310c) and "I" designates the destination of the message (ingress node 304). In accordance with features of the embodiment described herein, at the node 310b, the wavelength designation ("λ1") is inserted into the ResvErr message 424 to notify the ingress node 304 of the failure of the reservation. In this manner, the node 310b uses the ResvErr message 424 to tear down the reservation. In contrast, ResvErr messages are used only for failure notification in GMPLS.

Figure 2:
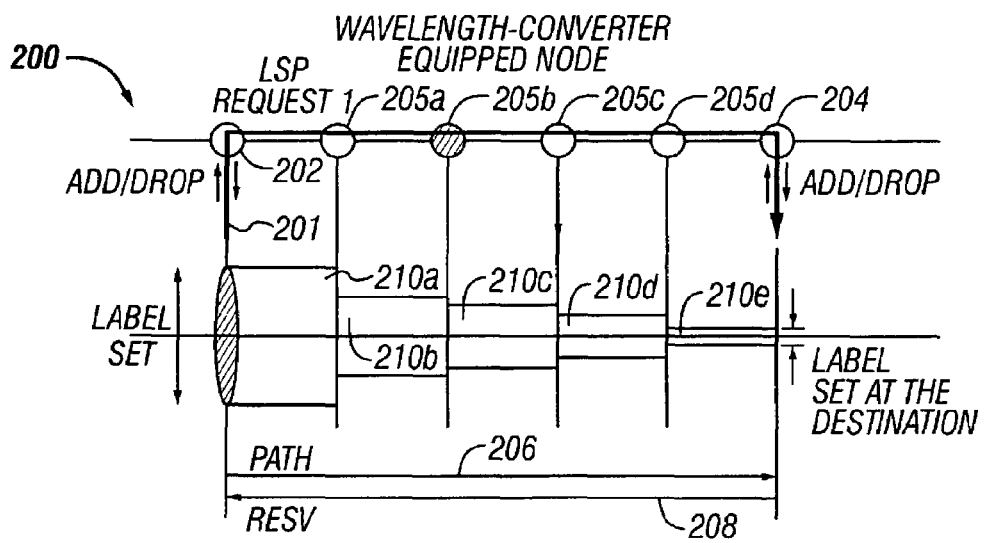
FIG. 2 illustrates prior art lightpath establishment procedures in a GMPLS network.
Figure 5:
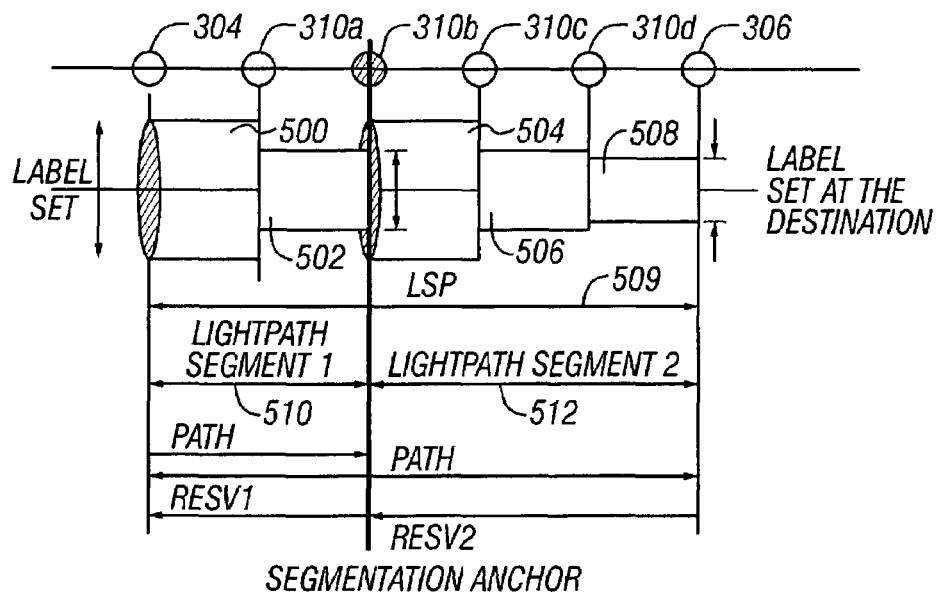
FIG. 5 illustrates a lightpath segmentation methodology of one embodiment of the present invention.

In FIG. 5, a Label Set 500 between the ingress node 304 and the intermediate node 310a is relatively large. As described above with reference to FIG. 2, subsequent Label Sets will typically be smaller than the initial Label Set. Accordingly, a Label Set 502 between the intermediate nodes 310a and 310b is smaller than the Label Set 500, as wavelengths have been removed from the Label Set 500 at the node 310a to form the Label Set 502. In contrast to the situation illustrated in FIG. 2, a Label Set 504 between nodes 310b and 310c is actually larger than the previous Label Set (Label Set 502). This is because the node 310b is equipped with a wavelength converter; therefore, all of the wavelengths in the AP at the node 310b are included in the Label Set 504. In this manner, the LSP 408 established as described above with reference to FIG. 4A comprises the lightpath segment 410a from the ingress node 304 to the intermediate node 310b, and the lightpath segment 410b from the intermediate node 310b to the egress node 306.

LPSP is the probability that the lightpath reservation will fail if segmentation is not performed at the node but at the next wavelength-converter-equipped node or the egress node, whichever is first. If the probability exceeds a certain threshold (indicating a likelihood of failure), then it would be better to perform segmentation at the current node; otherwise, segmentation will not be performed. The calculation and comparison to a threshold of an LPSP at each wavelength-converter-equipped node helps prevent the expense of additional control packets and early resource reservation in a network due to unnecessary segmentation. Segmentation is performed only where deemed necessary to prevent failure of the reservation process. Accordingly, the LPSP depends on the distance between the current wavelength-converter-equipped node and the next wavelength-converter-equipped or egress node.

The lightpath segmentation probability (LPSP)

$$p_{LPSP}^s$$

at a node that is capable of wavelength conversion can be defined as:

$$p_{LPSP}^s = 1 - (p_{nb}^{l_1})(p_{nb}^{l_2}|p_{nb}^{l_1})(p_{nb}^{l_3}|p_{nb}^{l_1}, p_{nb}^{l_2}) \cdots (p_{nb}^{l_k}|p_{nb}^{l_1}, p_{nb}^{l_2} \cdots p_{nb}^{l_{k-1}})$$

where:
- s, s∈S represents the next wavelength-converter-equipped node after node i;
- S represents the wavelength-converter-equipped nodes;

$$p_{nb}^{l_i}$$

is the probability that the wavelength selected by the original connection is not blocked on link $l_i$;
- $l_i$ represents the path between the ingress node (or upstream segmentation anchor) and the wavelength-converter-equipped node i; and
- k represents the number of hops between the ingress (or upstream Segmentation Anchor) node and the wavelength-converter-equipped node i.

The node that performs the segmentation is referred to as a Segmentation Anchor. The probability $$p_{nb}^{l_i}$$

depends on $$p_{nb}^{l_i}(LabelSet_{j, j \in (1 \ldots i)}, t_{ii}(s), \alpha)$$

where:
- $t_{ii}(s)$ represents the average delay if the lightpath is established by the next downstream wavelength-converter-equipped nodes along the path (if multiple lightpath segmentation is supported) or by the egress node (if multiple lightpath segmentation is not supported);
- $LabelSet_j$ represents the label set at node j; and
- α represents the average request arrivals using a moving window.

After calculation of lightpath segmentation probability according to the LabelSet and $t_{ii}(s)$, the wavelength-converter-equipped node i performs the lightpath segmentation procedure if and only if $$p_{LPSP}^s > p_{threshold}, \forall s \in S$$

where $P_{threshold}$ is the threshold probability.

Before giving the calculation of the average delay $t_{ii}(s)$, multiple lightpath segmentation will be explained in greater detail.

Figure 6:
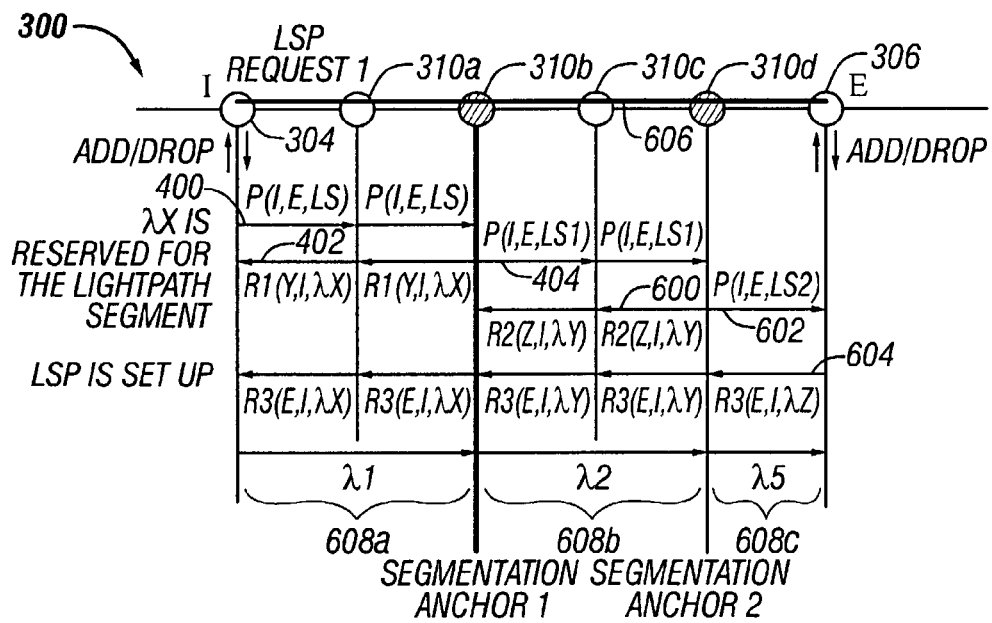
FIG. 6 illustrates a multiple lightpath segmentation methodology of one embodiment of the present invention.

Along the explicit route, each wavelength-converter-equipped node may decide to divide the lightpath into segments according to the probability LPSP. FIG. 6 illustrates a successful multiple lightpath segmentation methodology. In FIG. 6, both nodes 310b and 310d are wavelength-converter-equipped nodes. Establishment of an LSP proceeds as described with reference to FIG. 4A except that when the Path message 404 arrives at the node 310d, which, as previously indicated, is equipped with a wavelength converter (not shown), the node calculates the LPSP, as described in greater detail below, and determines that the lightpath should be segmented. Accordingly, the node 310d selects one of the wavelengths from the Label Set identified in the Path message 404 (e.g., λ5) and issues a second Resv message ("R2(Z, I, λy)") 600, in which "Z" identifies the source of the message(i.e., node 310d), "I" identifies the destination of the message (ingress node 304), and "λy" identifies the selected wavelength (i.e., λ2). Additionally, the node 310d enlarges the Label Set to include all of the available wavelengths at the node 310d and issues a Path message ("P(I, E, LS2)") 602, in which "I" identifies the source of the message (ingress node 304), "E" identifies the destination of the message (egress node 306), and "LS2" represents the new, enlarged Label Set.

Receipt by the node 310b of the Resv message 600 indicates to the node that λ2 has been reserved for the second lightpath segment. The ingress node 304 continues to await receipt of a Resv message from the egress node 306. Accordingly, because there are no other wavelength-converter-equipped nodes along the path to the destination (node 306), once the Path message 602 reaches the egress node 306, the node selects a wavelength from the Label Set, for example, λ5, and generates a message ("R3 (E, I, λz)") 604, in which "E" identifies the source of the message (egress node 306), "I" identifies the destination of the message (ingress node 304), and "λz" identifies the selected wavelength (i.e., λ5) for the third segment. Along the path, when the wavelength-converter-equipped node 310d receives the Resv message 604, it only changes the wavelength designation from λ5 to λ2. Similarly, when the node 310b receives the Resv message 604, it changes the wavelength designation from λ2 to λ1. Upon receipt by the ingress node 304 of the Resv message 604, an LSP 606 comprising a first segment 608a, for which λ1 is used, a second segment 608b, for which λ2 is used, and a third segment 608c, for which λ5 is used, is established between the ingress node 304 and the egress node 306.

In order to support multiple lightpath segmentation, as described above with reference to FIG. 6, the wavelength converter should be able to calculate the average delay $t_{ii}(s)$ between itself and the next downstream wavelength-converter-equipped node s. Accordingly, Open Shortest Path First ("OSPF") protocol extensions to calculate the required average delay $t_{ii}(s)$ in order to support multiple segmentation are proposed below.

In order to support multiple lightpath segmentation, in the Link State Advertisement, information about the location of wavelength-converter-equipped nodes should be included. Therefore, the number of hops between the wavelength-converter-equipped nodes is necessary to know the parameter $t_{ii}(s)$ value in order to calculate the LPSP.

If this OSPF extension is not supported, then only a single lightpath segmentation per lightpath is possible. Then, the wavelength-converter-equipped node is able to calculate the average delay between itself and the egress node only.

Figure 7:
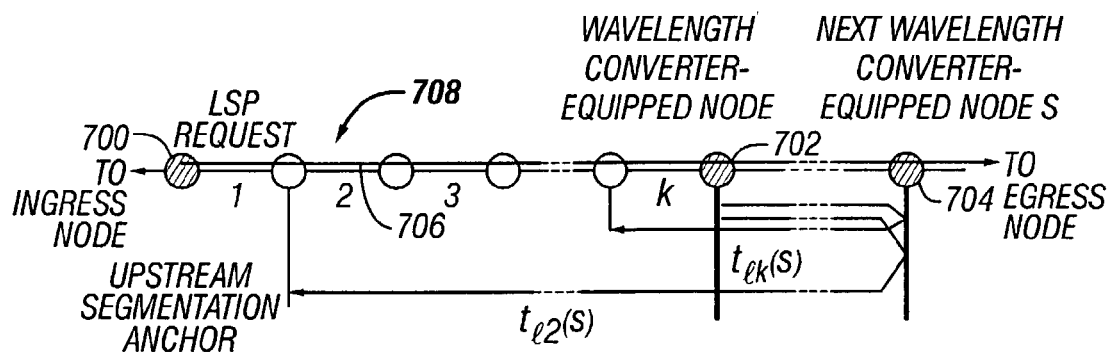
FIG. 7 illustrates calculation of an average delay parameter in accordance with one embodiment of the present invention.

FIG. 7 illustrates the average delay parameter ($t_{li}(s)$) for multiple lightpath segmentation (from the point of view of a node 702), such as is illustrated in FIG. 6. In FIG. 7, several nodes 700, 702, and 704 along a lightpath 706 in an optical network 708 are equipped with wavelength converters and hence are capable of serving as Segmentation Anchors. Moreover, it will be assumed that the node 700 has already performed a first lightpath segmentation and became an upstream segmentation anchor. If any of the wavelength-converter-equipped nodes 700, 702, 704, are not able to locate the next wavelength converter along the path (e.g., the system does not support the OSPF protocol extensions proposed herein), then the calculation of the parameter $t_{li}(s)$ is based on the egress node (not shown).

In one embodiment, a wavelength-converter-equipped node, such as the node 702, can calculate the actual average delay parameter for single and multiple segmentation embodiments using the OSPF protocol and both OSPF protocol and proposed OSPF protocol extensions, respectively. If OSPF is slow to update the link states, then the nodes should estimate the average delay.

The parameter $t_{li}(s)$ can be estimated by an averaging function $$t_{li}(s) = \beta t_{li}^{ave}(s) + (1-\beta)t_{li}^n(s),\ 0 < \beta < 1$$

such as the Round Trip Time ("RTT") calculation in Transmission Control Protocol ("TCP"), as the lengths of the LSPs vary. The parameters represent the following:

$t_{li}(s)$ represents the estimated average delay if the lightpath is established by the next downstream wavelength-converter-equipped node s along the path (if multiple lightpath segmentation is supported) or by the egress node (if multiple lightpath segmentation is not supported);

$$t_{li}^{ave}(s)$$

(S) represents the moving value of the average delay;

$t_h^n(s)$ represents the average delay of the last label request n;

β represents the weight factor and is generally selected to be close to 1.

In order to support the embodiments described herein, several RSVP extensions should be added. The first is a Path message extension. Each node along the path inserts an object into the Path message, including the LabelSet$_j$ value, $j \in \{1, \ldots, i\}$ and hop number. In this manner, a wavelength-converter-equipped node receives the values i and LabelSet for each hop.

Another RSVP extension is a Resv message extension. A Segmentation Anchor node sends a Resv message to a previous upstream Segmentation Anchor (or to the ingress node, if there is no upstream. Segmentation Anchor) to establish the lightpath. The Segmentation Anchor should insert an object into the Resv message indicating the owner of the message. If the ingress node receives the Resv message from a Segmentation Anchor, it sets up the lightpath according to the assigned wavelength, but it does not transmit any data until it receives the Resv message from the egress node. This last Resv message is a confirmation message that the lightpath is established from end-to-end.

Figure 8A:
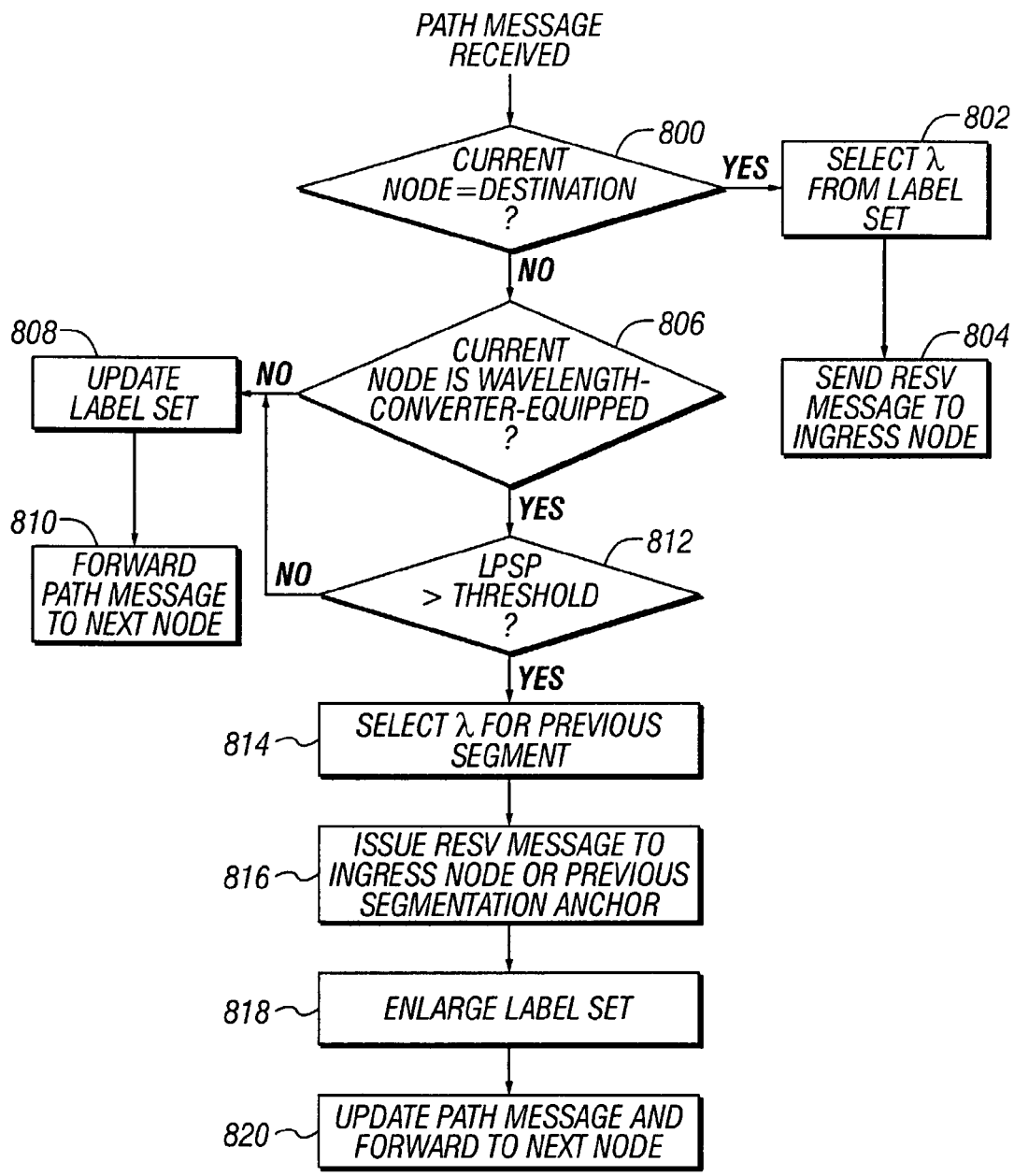
FIGS. 8A and 8B are flowcharts illustrating the operation of one embodiment of the present invention.
Figure 8B:
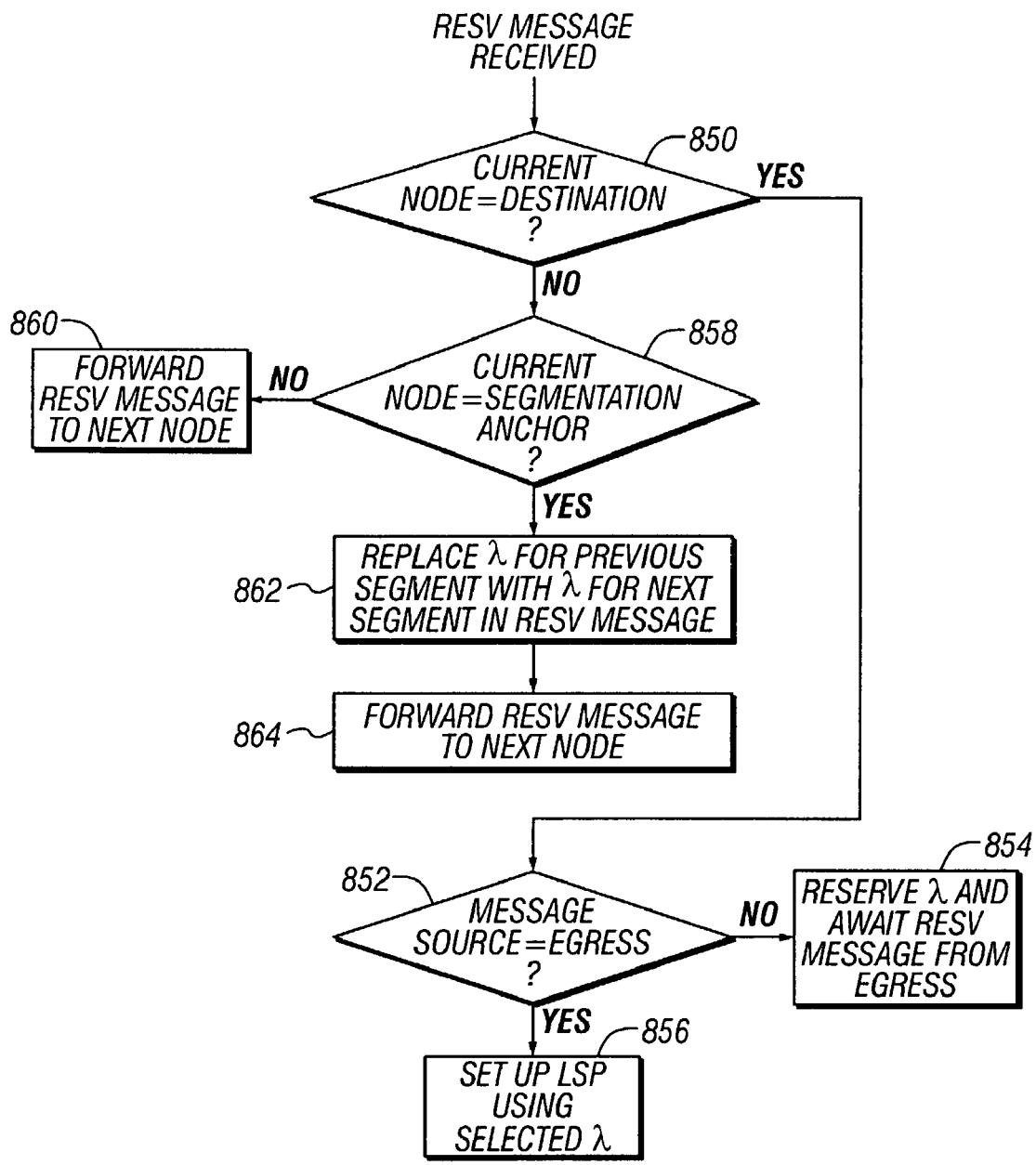

FIGS. 8A and 8B depict flowcharts of the methodology of one embodiment of the present invention. FIG. 8A depicts a response by a node in a GMPLS network to receipt of a Path message in accordance with one embodiment. FIG. 8B depicts a response by a node in a GMPLS network to receipt of a Resv message in accordance with one embodiment.

In FIG. 8A, responsive to receipt by a node of a Path message, in step 800, a determination is made at the node whether the current node is the destination of the message. In other words, a determination is made whether the node is the egress node for the requested path. If so, execution proceeds to step 802, in which the node selects a wavelength from the Label Set indicated in the Path message, and then to step 804, in which the node sends a Resv message to the ingress node indicating the selected wavelength.

If in step 800 it is determined that the current node is not the destination of the message (i.e., the node is an intermediate node), execution proceeds to step 806, in which a determination is made whether the current node is equipped with a wavelength converter. If not, execution proceeds to step 808, in which the Label Set of the Path message is updated as described above, and then to step 810, in which the Path message is forwarded to the next node along the path. Conversely, if in step 806 it is determined that the node is wavelength-converter-equipped, execution proceeds to step 812, in which a determination is made whether an LPSP at the node exceeds a predetermined threshold. If not, execution proceeds to step 808; otherwise, execution proceeds to step 814.

In step 814, a wavelength for use in the previous segment is selected from the Label Set contained in the Path message. In step 816, a Resv message is issued to the ingress node (or to a previous segmentation anchor, of one exists). In step 818, the Label Set is enlarged, as previously described. In step 820, the Path message is updated with the enlarged Label Set and forwarded to the next node along the path.

In FIG. 8B, responsive to receipt by a node of a Resv message that is initiated by the egress node, in step 850, a determination is made at the node whether the current node is the destination of the message. In other words, a determination is made whether the node is the ingress node for the requested path. If so, execution proceeds to step 852, in which a determination is made whether the message source is the egress node for the path. If not, execution proceeds to step 854, in which the wavelength indicated in the Resv message is reserved and the ingress node awaits a Resv message from the egress node. Otherwise, execution proceeds to step 856, in which the LSP is set up using the indicated wavelength.

If in step 850 it is determined that the current node is not the destination of the message, execution proceeds to step 858, in which a determination is made whether the current node is a Segmentation Anchor. If not, execution proceeds to step 860, in which the message is forwarded to the next node along the path; otherwise, execution proceeds to step 862. In step 862, the wavelength for the previous segment, as indicated in the Resv message received at the node, is replaced with the wavelength for the next segment. In step 864, the Resv message is forwarded to the next node in the path.

Based upon the foregoing Detailed Description, it should be readily apparent that the present invention advantageously provides an innovative and efficient solution for providing a lightpath segmentation methodology in a GMPLS network. In particular, the invention provides a lightpath establishment procedure that decreases the number of wavelength collisions and that is fairer for longer lightpaths. In addition, the procedure can be implemented within the existing RSVP/CR-LDP signaling and OSPF routing protocols.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. An optical network using a generalized multi-protocol label switched path protocol for establishing lightpaths in the network, the network comprising:
   an ingress node that transmits a path set-up request message toward a destination node, wherein the path set-up request message includes a first label set of available wavelengths for a requested lightpath from the ingress node to the destination node, the first label set initially designating wavelengths available at the ingress node and being modified at each one of any nodes along the path of the set-up request message to remove any wavelengths which are not available at the one node for the requested lightpath; and
   an intermediate node optically connected between the ingress node and the destination node, wherein the intermediate node is equipped with a wavelength converter interface, the intermediate node segmenting the set-up of the requested lightpath, including establishing a first segment of the requested lightpath between the intermediate node and the ingress node by transmitting a first reserve message to the ingress node and transmitting a second path set-up request message to the destination node with a second label set of available wavelengths for the requested lightpath, the second label set initially designating wavelengths available at the intermediate node and being modified at each one of any nodes along the path of the second path set-up request message to remove any wavelengths which are not available at the one node for the requested lightpath;
   wherein upon receipt of the second path set-up request message, the destination node selects an available wavelength from the second label set of available wavelengths, and reserves a second segment of the requested lightpath between the destination node and the intermediate node by transmitting a second reserve message to the ingress node,
   wherein the segmenting of the set-up by the intermediate node enables the utilization of the second label set made possible by the wavelength converter interface.

2. The network of claim 1 wherein the first and second segments collectively comprise the entire lightpath between the ingress node and the destination node.

3. An optical network using a generalized multi-protocol label switched path protocol for establishing lightpaths in the network, the network comprising:
   an ingress node that transmits a path set-up request message to a destination node, wherein the path set-up request message includes a first label set of available wavelengths for a lightpath from the ingress node to the destination node; and
   an intermediate node optically connected between the ingress node and the destination node, wherein the intermediate node is equipped with a wavelength converter interface, the intermediate node establishing a first segment of the lightpath between the intermediate node and the ingress node by transmitting a first reserve message to the ingress node and transmitting a second path set-up request message to the destination node with a second label set of available wavelengths for the lightpath;
   wherein upon receipt of the second path set-up request message, the destination node selects an available wavelength from the second label set of available wavelengths, and reserves a second segment between the destination node and the intermediate node by transmitting a second reserve message to the ingress node.
   wherein prior to the intermediate node transmitting the first reserve message to the ingress node, the intermediate node calculates a lightpath segmentation probability ("LPSP") for the intermediate node, and transmits the first reserve message to the ingress node and transmits a second path set-up request message to the destination node only if the LPSP exceeds a predetermined threshold.

4. The network of claim 3 wherein if the LPSP does not exceed the predetermined threshold, the intermediate node updates the first label set of the first path set-up request message and forwards the updated first path set-up request message to a next node along the lightpath to be established.

5. The network of claim 1 wherein the first reserve message includes an indication of a wavelength selected from the first label set to be used for the first segment.

6. The network of claim 1 wherein the second reserve message includes an indication of a wavelength selected from the second label set to be used for the second segment.

7. The network of claim 1 wherein the second label set includes all available wavelengths at the intermediate node.

8. The network of claim 1 wherein the ingress node awaits receipt of a reservation message from the destination node before setting up a label switched path between the ingress node and the destination node.

9. A method of using a generalized multi-protocol label switched ("GMPLS") path protocol for establishing lightpaths in an optical network, the method comprising the steps of:
   transmitting a path set-up request message from an ingress node toward a destination node, the path set-up request message including a first label set of available wavelengths for a requested lightpath from the ingress node to the destination node, the first label set initially designating wavelengths available at the ingress node and being modified at each one of any nodes along the path of the set-up request message to remove any wavelengths which are not available at the one node for the requested lightpath;
   determining that an intermediate node optically connected between the ingress node and the destination node has a wavelength converter interface;
   segmenting the set-up of the requested lightpath, including
      transmitting a first reserve message from the intermediate node to the ingress node thereby establishing a first segment of the requested lightpath;
      transmitting a second path set-up request message from the intermediate node to the destination node, the second path set-up request message including a second label set of available wavelengths for the requested lightpath, the second label set initially designating wavelengths available at the intermediate node and being modified at each one of any nodes along the path of the second path set-up request message to remove any wavelengths which are not available at the one node for the requested lightpath;

responsive to receipt at the destination node of the second path set up request message, selecting an available wavelength from the second label set of available wavelengths; and reserving a second segment of the requested lightpath between the destination node and the intermediate node by transmitting a second reserve message from the destination node to the ingress node, wherein the process of segmenting enables the utilization of the second label set made possible by the wavelength converter interface.

10. The method of claim 9 wherein the first and second segments collectively comprise the lightpath between the ingress node and the destination node.

11. A method of using a generalized multi-protocol label switched ("GMPLS") path protocol for establishing lightpaths in an optical network, the method comprising the steps of:

transmitting a path set-up request message from an ingress node to a destination node, the path set-up request message including a first label set of available wavelengths for a lightpath from the ingress node to the destination node;

providing an intermediate node optically connected between the ingress node and the destination node with a wavelength converter interface;

calculating a lightpath segmentation probability ("LPSP") at the intermediate node;

only if the LPSP exceeds the predetermined threshold, performing the following steps transmitting a first reserve message from the intermediate node to the ingress node thereby establishing a first segment of the lightpath;

transmitting a second path set-up request message from the intermediate node to the destination node, the second path set-up request message including a second label set of available wavelengths for the lightpath;

responsive to receipt at the destination node of the second path set-up request message, selecting an available wavelength from the second label set of available wavelengths; and reserving a second segment between the destination node and the intermediate node by transmitting a second reserve message from the destination node to the ingress node.

12. The method of claim 11 further comprising the steps of:

if the LPSP does not exceed the predetermined threshold, updating the first label set; and forwarding the first path set-up request message to a next node along the lightpath to be established.

13. The method of claim 9 wherein the first reserve message includes an indication of a wavelength selected from the first label set to be used for the first segment.

14. The method of claim 9 wherein the second reserve message includes an indication of a wavelength selected from the second label set to be used for the second segment.

15. The method of claim 9 wherein the second label set includes all available wavelengths at the intermediate node.

16. The method of claim 9 wherein the ingress node awaits receipt of a reservation message from the destination node before setting up a label switched path between the ingress node and the destination node.

17. A method of using a generalized multi-protocol label switched ("GMPLS") path protocol for establishing lightpaths in an optical network, the method comprising the steps of:

transmitting a path set-up request message from an ingress node to an egress node via at least one intermediate node, the path set-up request message including a first label set of available wavelengths for a lightpath from the ingress node to the egress node;

at each intermediate node, upon receipt of the path set-up request message:

determining whether the intermediate node is wavelength-converter-equipped;

if the intermediate node is wavelength-converter-equipped, determining whether a lightpath segmentation probability ("LPSP") exceeds a predetermined threshold;

if the intermediate node is not wavelength-converter-equipped or if the LPSP does not exceed the predetermined threshold:

updating the first label set; and forwarding the path set-up request message to a next node along the lightpath;

if the intermediate node is wavelength-converter-equipped and the LPSP exceeds a predetermined threshold:

transmitting a second path set-up request message from the intermediate node to the egress node, the second path set-up request message including a new label set of available wavelengths for the lightpath;

transmitting a first reserve message from the intermediate node to the ingress node;

responsive to receipt at the egress node of a path set-up request message, selecting an available wavelength from the label set of available wavelengths contained within the received path set-up request message; and transmitting a second reserve message from the egress node to the ingress node.

18. The method of claim 17 wherein the step of updating is performed by removing from the label set included in the path set-up request message all of the wavelengths that are not available at the intermediate node.

19. The method of claim 17 wherein the step of updating the first label set comprises the step of removing from the first label set any wavelengths that are not available at the intermediate node.

20. The method of claim 17 wherein each reserve message includes an indication of a selected wavelength.

21. The method of claim 20 further comprising the steps of, at each node, upon receipt of a reserve message:

determining whether the node is the destination of the reserve message;

if the node is the destination of the reserve message, determining whether the source of the reserve message is the egress node;

if the source of the reserve message is the egress node, setting up a label switched path using the selected wavelength indicated in the reserve message; and if the source of the reserve message is not the egress node, reserving the selected wavelength indicated in the reserve message and awaiting a reserve message from the egress node.

22. The method of claim 21 further comprising the steps of, at each node, upon receipt of a reserve message:
- if the node is not the destination of the message, determining whether the node is a segmentation anchor comprising a wavelength-converter-equipped intermediate node;
- if the node is a segmentation anchor, updating the reserve message by replacing the selected wavelength indicated in the reserve message with a selected wavelength for a next segment of the lightpath and forwarding the updated reserve message to a next node along the lightpath; and
- if the node is not a segmentation anchor, forwarding the reserve message to a next node along the lightpath.

* * * * *